United States Patent [19]

Frank

[11] Patent Number: 4,594,683

[45] Date of Patent: Jun. 10, 1986

[54] APPARATUS FOR FIXING A COORDINATE POINT WITHIN A FLAT DATA REPRESENTATION

[76] Inventor: Joachim Frank, Kriegsstrasse 15, D-6831 Oberhausen-Rhsn. 1, Fed. Rep. of Germany

[21] Appl. No.: 509,218

[22] Filed: Jun. 29, 1983

[30] Foreign Application Priority Data

Jul. 7, 1982 [DE] Fed. Rep. of Germany ....... 3225298
Sep. 7, 1982 [DE] Fed. Rep. of Germany ....... 3233115

[51] Int. Cl.⁴ .......................... G06F 3/033; G06F 3/16
[52] U.S. Cl. ................................ 364/900; 340/365 R
[58] Field of Search ... 364/200 MS File, 900 MS File, 364/444, 518, 440, 520; 340/407, 703, 365 R; 33/1 M; 434/116

[56] References Cited

U.S. PATENT DOCUMENTS

| | | | |
|---|---|---|---|
| 3,845,285 | 10/1974 | Leroy | 364/518 |
| 3,887,903 | 6/1975 | Martell | 364/200 |
| 3,918,179 | 11/1975 | Mauch et al. | 434/116 |
| 4,070,710 | 6/1978 | Sukonick et al. | 364/900 |
| 4,086,632 | 4/1978 | Lions | 364/444 |
| 4,287,564 | 9/1981 | Swift et al. | 364/518 |
| 4,322,744 | 3/1982 | Stanton | 434/116 |

*Primary Examiner*—Harvey E. Springborn

*Attorney, Agent, or Firm*—Laff, Whitesel, Conte & Saret

[57] ABSTRACT

In an apparatus as a working aid for blind and partially sighted people for communication with a computer system with a keyboard and with a screen output for a screen as an output device for determining a raster coordinate point of said screen output and for producing an electrical data signal corresponding to said coordinate point for the repeat and reliable finding of a particular information corresponding to a certain coordinate point, at least two data call-up devices are provided capable of calling up the data corresponding to a certain coordinate point in the form of only end position-stable sliders movable independently of one another in two coordinate directions perpendicular to one another. Thus defining by the relative coordinate position the certain coordinate point, one of the sliders being arranged above or below and one of the sliders being arranged to one of the sides of said keyboard, a position detection device is provided at each slider for supplying an electrical signal corresponding to the displacement path of each slider along one of the coordinate directions being subdivided in raster sections. The call-up devices having a data call-up release device to call up the converted read-out data corresponding to the certain coordinate point at a desired moment.

4 Claims, 4 Drawing Figures

APPARATUS FOR FIXING A COORDINATE POINT WITHIN A FLAT DATA REPRESENTATION

BACKGROUND OF THE INVENTION

This invention relates to an apparatus for fixing a raster coordinate point within a flat data representation and for producing an electrical data signal corresponding to the coordinate point, particularly for placing in the vicinity of a keyboard for a computer system or the like.

Known apparatuses of this type are formed e.g. by a control stick movable in two coordinate directions. In addition, foils operable by finger pressure and equipped with capacitive switches, as well as optically released light pencils are known. Finally, apparatus exist, which can be operated by use of a flat data representation, the movement being sensed in a rolling ball and converted into electrical signals. All these known apparatuses suffer from the disadvantage that they do not permit, or only inadequately permit the giving of absolute settings with respect to the coordinate directions and the values for the individual coordinates and generally it is also not ensured that the set coordinate point remains unchanged when operation by the user is interrupted.

Computers can be advantageously used by blind and partially sighted people, because communication with the computer takes place from a fixed operating position, with a spatially constant keyboard and on the basis of fixed diagrams. However, they have problems in that, in conventional installations, the computer output is in the form of a printout or is shown on a screen. To enable blind and partially sighted people to perceive this output, devices have been developed which convert the data output into synthetic speech or reproduce portions of the screen picture on a greatly increased scale. Although this fundamentally makes it possible to perceive the data output, considerable difficulties have resulted for the following reasons.

For efficient working, it is necessary for blind and partially sighted people to use programs developed for sighted users. These programs frequently work in such a way that the output is based on perception by use of a screen, i.e. the screen shows operating lists for the input (menus), data input forms (masks) or working tables for dynamic calculation representations (worksheets). These representations are used in such a way that by use of the keyboard, the operator feeds in information and the computer gives an answer either in the form of a short character sequence, e.g. an error message, or as an output covering most of the screen, or e.g. in the case of a list-type output covers more than one complete screen side, so that after reading over the first screen side, the output of the following side must be operated. In the latter case of a more comprehensive screen output, the operator will frequently not read the content of the information fed out completely and in order and will instead only seek out those parts of interest to him by diagonal scanning with the eye. However, this is not possible for blind and partially sighted persons, who can only use a conventional speech or large picture output. They have to receive all the information in order, which is extremely disadvantageous with regards to the ease of acquisition of the stored data and with regards to the working speed.

In addition, output ways are known, which supply the data fed out in Braille form. This script is scanned by feel, by a blind person, so that, for him to communicate with the computer for reading the output, he must remove his hands from the keyboard and then, for entering further data, must orient himself again with respect to the keyboard. In addition, such a printout is naturally relatively complicated.

On the basis of this, a further partial problem of the invention is to so develop an apparatus of the aforementioned type that blind and partially sighted people can rapidly and easily be provided with computer output information intended for screen display, the apparatus being very reliable, inexpensive to manufacture and compact.

According to the invention, there is provided apparatus as a working aid for blind and partially sighted people for communication with a computer system with a keyboard and with a screen output for a screen as an output device for determining a raster coordinate point of said screen output and for producing an electrical data signal corresponding to said coordinate point, said apparatus including a device for converting the read-out data into speech or as a large picture, wherein at least two data call-up devices are provided capable to call up the data corresponding to a certain coordinate point in the form of two only end position-stable sliders movable independently of one another in two coordinate directions perpendicular to one another, thus defining by their relative coordinate position said certain coordinate point, one of said sliders being arranged above or below and one of said sliders being arranged to one of the sides of said keyboard, a position detection device being provided at each slider for supplying an electrical signal corresponding to the displacement path of this slider along one of the coordinate directions being subdivided in raster sections, and said call-up devices having a data call-up release device to call up said converted read-out data corresponding to said certain coordinate point at a desired moment.

The displacement paths of the sliders thus cover a surface corresponding to the flat data representation, so that a raster coordinate point of this surface is fixed by the position of the two sliders movable along two coordinate directions perpendicular to one another. The information call-up release devices on each slider make it possible e.g. to call up the information content of the particular raster coordinate point, if both devices are simultaneously operated, or the information content of an associated row or column when operating only one of these devices. As a result of this construction according to the invention, the blind or partially sighted person has in particular the possibility of quickly looking over a page of text in the same way as a sighted person.

This is insofar important for those persons as frequently pages are not completely filled especially if they contain columns of numbers or the like. Blind persons and partially sighted persons have no survey about such a page and it takes them a lot of time to get an idea of the contents of such a page. According to the invention it is easy for such people to find very quickly those raster coordinate points which contain a desired information. Furthermore, it is important for such persons to quickly locate again a certain point to continue the read-out of information, e.g. after an interruption of work. As the sliders according to the invention are end position-stable the blind persons may feel for the sliders, can find them easily and can continue to work to read out information exactly from the point where the work was interrupted.

BRIEF DESCRIPTION OF THE DRAWINGS

Further features, advantages and details of the invention can be gathered from the drawings, in which.

DESCRIPTION OF PREFERRED EMBODIMENT

Figure 1:
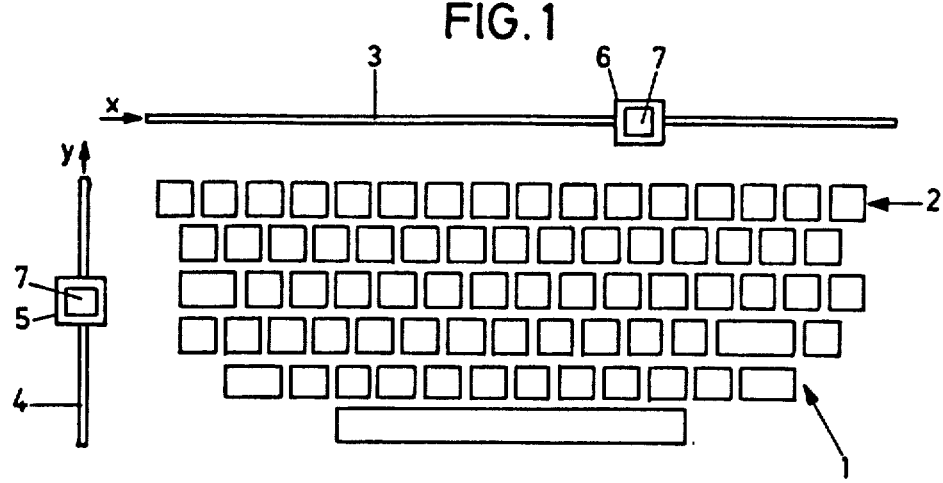
FIG. 1 is a plan view of a keyboard with an apparatus according to the invention.

FIG. 1 shows a keyboard 1 of the type known in connection with computer input equipment. To this keyboard has merely been added an additional row of keys 2 for use in operations particularly required in the case of operation by blind and partially sighted people. This row of keys 2 can be replaced by a single shift key, so that after operating the latter, the individual input keys can be used as function keys.

In the horizontal and vertical directions above or to the sides of keyboard 1, slots 3 and 4 are provided, in which sliders 5 and 6 are displaceable in end positionstable manner. Slot 4 determines the Y-direction and slot 3 the X-direction. Each slider 5, 6 is provided with a data output release device 7 in the form of an electrical pushbutton switch.

Figure 2:
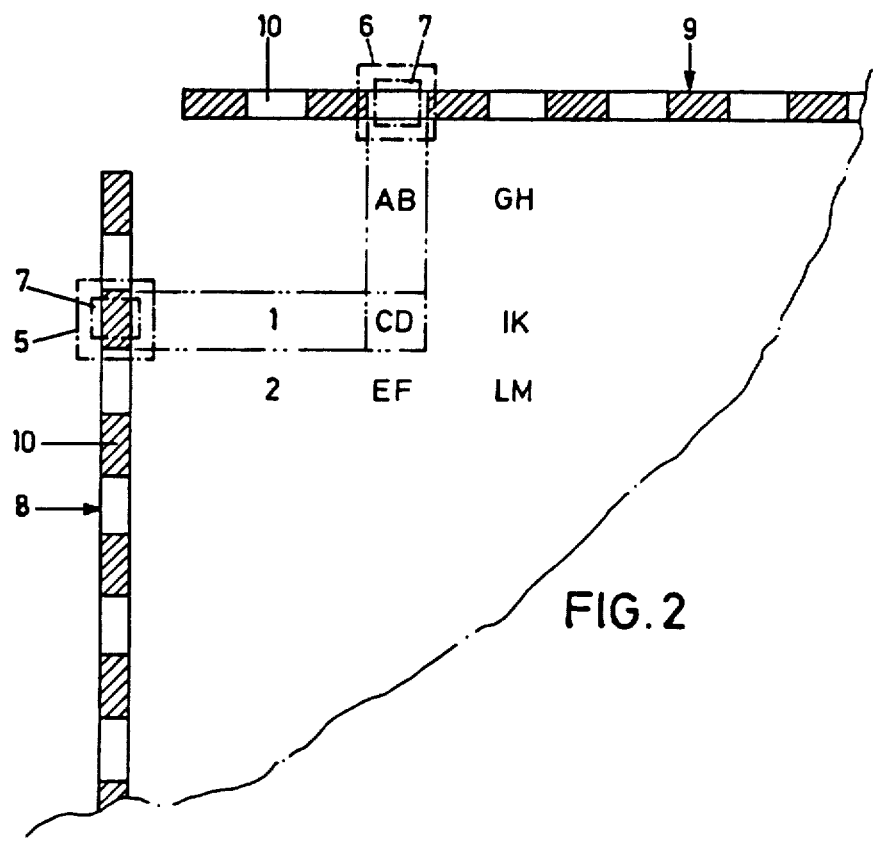
FIG. 2 is a representation illustrating the association of the individual raster points of the displacement paths of the sliders to the raster coordinate points of a flat data representation.

Below the scale carrier, scales 8, 9 having a light-dark system are associated with slots 3 and 4. Only scales 8, 9 are shown in FIG. 2. Thus, in this way, each light or dark area defines a raster section 10.

As can be gathered from the sectionwise representation of an imaginary screen in FIG. 2, a raster coordinate in the plane covered by scales 8, 9 is in each case defined by a raster section 10 of scale 8 or 9. Through the operation of the release devices 7 of the two sliders 5, 6, the data "CD" is supplied in the representation of FIG. 2. By operating only the release device 7 of slider 6, column AB is fed out downwards, as from the position of slider 5. By only operating release device 7 of slider 5, row "1 CD IK" is read out starting from the position of slider 6, i.e. as from "CD". It obviously falls within the scope of the invention to release a release process particularly adapted to the specific problem involved by a corresponding construction of the software. It is common to all the procedures that through the positioning of sliders 5 and 6, a raster coordinate point is defined.

For determining the position of each slider 5, 6, in each case a position determination device 11 is provided and in principle devices 11 of sliders 5, 6 are identically constructed. As stated in connection with FIG. 2, each position determination device 11 comprises a scale 8, 9, formed by successive light or dark raster sections 10.

Each slider 5, 6 is provided with two optical scanners 12, 13, which in each case have a light transmitter 14 and a light receiver 15 arranged in the reflection position thereto. The reciprocal spacing of scanners 12, 13 is dimensioned in such a way that their scanning points 16, 17 have a distance from one another, which is smaller than the length of a raster section 10. The outputs of scanners 12, 13 lead to an electronic evaluation means 18, which evaluates the signal sequences, related to the individual scanners 12 or 13. Thus, on setting for a dark raster field 10, e.g. signal 0 and for a light raster field 10, e.g. signal 1, on moving in one direction, e.g. on the part of slider 5, there is a signal sequence, (1,0), (0,0), (0,1), whilst when moving in the other direction the signal sequence is (0,1), (1,1), (1,0), so that a direction discrimination is possible and simultaneously an electronic raster distribution of the surface covered by scales 8, 9.

The electrical connection between sliders 5, 6 or scanners 12, 13 with electronics 18 takes place by means of a cable 19, which rolls up or rolls out automatically during the displacement. The evaluation electronics 18 and consequently scanners 12, 13 are followed by a tone generator 20, which makes it possible to supply a tone corresponding to the information content read out. Thus, e.g. a high pitched tone can be given, which indicates that the particular row or column is empty. In addition, by different tone pictures, it is possible to indicate the significance contents of the particular coordinate point. Finally, for example, by associating rising tone pitches with successive rows, it is possible to acoustically perceive the raster distribution of the rows. Thus, through the use of a tone generator 20, very different data content can be acoustically read out.

The invention is not restricted to the above-described embodiment but modifications and variations may be made without departing from the spirit and scope of the invention as defined by the appended claims.

Figure 3:
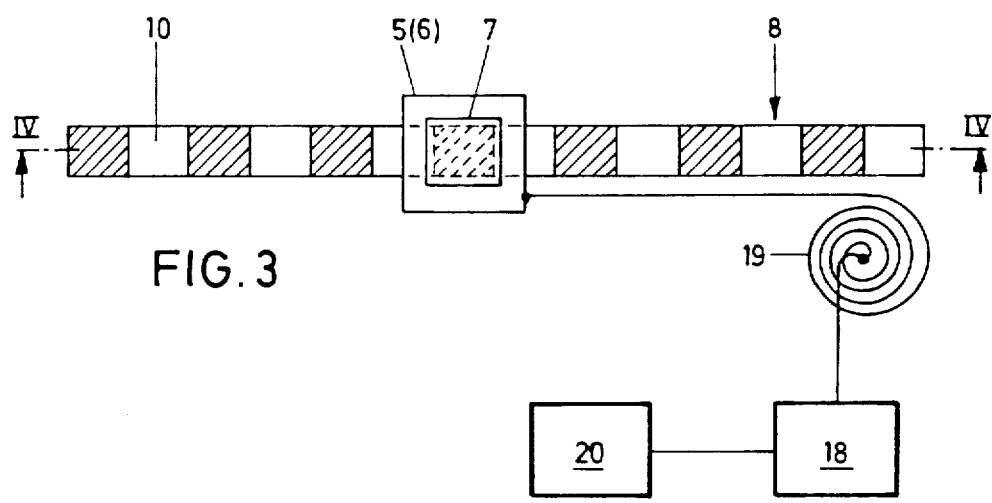
FIG. 3 is a section through a slider with associated scale.
Figure 4:
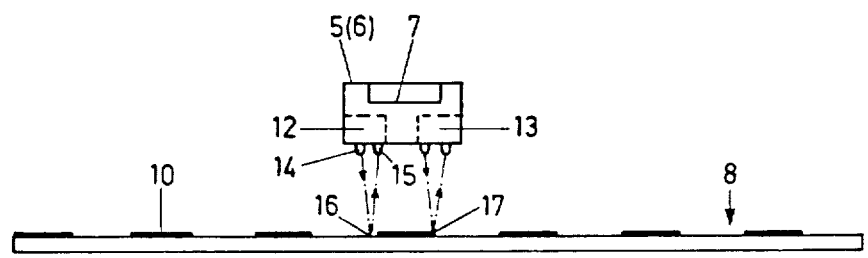
FIG. 4 is a section through a representation of FIG. 3 along the line IV—IV.

Block elements 18 and 20 as shown in FIG. 3 are described in detail by L. D. Scadden: Kurzweil Reading Machine, Evaluation of Model 1, Journal of visual impairment and blindness, vol. 72 No. 10, Dec. 78, page 415–418.

To create a large-print output of a computer screen is known for example from Reivew DP10 for Apple II, Journal of visual impairment and blindness, vol. 74, 1980.

To control a tone-generator either in amplitude or in pitch is wellknown since many years and is e.g. described in "Elektronik ohne Ballast", Franzis-Verlag, 1978, page 149.

I claim:

1. Apparatus as a working aid for blind and partially sighted people for communication with a computer system with a keyboard and with a screen output for a screen as an output device for determining a raster coordinate point of said screen output and for producing an electrical data signal corresponding to said coordinate point, said apparatus including a device for converting the read-out data into speech or as a large picture, wherein at least two data call-up devices are provided capable to call up the data corresponding to a certain coordinate point in the form of two only end position-stable sliders movable independently of one another in two coordinate directions perpendicular to one another, thus defining by their relative coordinate position said certain coordinate point, one of said sliders being arranged above or below and one of said sliders being arranged to one of the sides of said keyboard, a position detection device being provided at each slider for supplying an electrical signal corresponding to the displacement path of this slider along one of the coordinate directions being subdivided in raster sections, and said call-up devices having a data call-up release device to call up said converted read-out data corresponding to said certain coordinate point at a desired moment.

2. Apparatus as claimed in claim 1, in which the position detection devices are followed by tone generators for the acoustic identification of the transition from one raster section to the next raster section during the displacement of said sliders.

3. Apparatus as claimed in claim 1, in which the displacement path of each slider is subdivided into a raster by an associated light-dark scale and an optical scanner which scans the scale is used for position determination purposes.

4. Apparatus as claimed in claim 1, in which each position detection device comprises two reflection scanning devices arranged on each slider.

* * * * *